Dec. 7, 1965    A. C. ADAMS ETAL    3,221,641
BUNDLING MACHINE

Filed Nov. 14, 1962    9 Sheets-Sheet 1

Fig. 1A.

INVENTORS
ALBERT C. ADAMS
BY EDWARD S. BIALOG
ATTORNEY

INVENTORS
ALBERT C. ADAMS
EDWARD S. BIALOG
BY
ATTORNEY

Dec. 7, 1965  A. C. ADAMS ETAL  3,221,641
BUNDLING MACHINE
Filed Nov. 14, 1962  9 Sheets-Sheet 4

Fig. 6.

INVENTORS
ALBERT C. ADAMS
BY EDWARD S. BIALOG

ATTORNEY

Dec. 7, 1965 A. C. ADAMS ETAL 3,221,641
BUNDLING MACHINE
Filed Nov. 14, 1962 9 Sheets-Sheet 7

INVENTORS
ALBERT C. ADAMS
BY EDWARD S. BIALOG
ATTORNEY

Dec. 7, 1965   A. C. ADAMS ETAL   3,221,641
BUNDLING MACHINE

Filed Nov. 14, 1962   9 Sheets-Sheet 8

Fig. 10.

INVENTORS
ALBERT C. ADAMS
BY EDWARD S. BIALOG

ATTORNEY

Fig. 12.

INVENTORS
ALBERT C. ADAMS
BY EDWARD S. BIALOG
ATTORNEY

United States Patent Office
3,221,641
Patented Dec. 7, 1965

3,221,641
BUNDLING MACHINE
Albert C. Adams, Flushing, and Edward S. Bialog, West Hempstead, N.Y., assignors to Republic Steel Corporation, Cleveland, Ohio, a corporation of New Jersey
Filed Nov. 14, 1962, Ser. No. 237,681
12 Claims. (Cl. 100—7)

This invention relates to a bundling machine. The invention was conceived and developed as a tube bundling machine, and it will be so illustrated and described. However, it will become obvious that the machine is equally useful for bundling any generally tubular articles. The term "tube" as employed in the specification and claims shall, therefore, be read in its broad sense to include not only tubular articles, but also rods or any other elongated, slender articles of generally uniform cross-section.

It is the primary object of this invention to provide a machine which will operate wholly automatically and in a continuous manner to form and tie tube-like articles into bundles containing a predetermined number of such articles, and which will form bundles of uniform size and symmetrical cross-sectional shape.

It is a further object of this invention to provide a plurality of improved tape applying assemblies in a bundle tying machine. To this end the invention provides a mechanism for wrapping an adhesively coated tape about a rotating bundle of tube-like articles; the tape being applied to the bundle by devices which are composed of relatively few moving parts.

The machine is provided with an article transfer reel which engages articles, one at a time, and transfers them from a supply of such articles to an article support in the machine where a predetermined number of articles are accumulated to form a bundle. After a predetermined number of articles are singly and continuously transferred to the support, a transfer cradle is rendered operative to lift the articles simultaneously from the support and advance the same as a group to a bundle forming station where the articles are shaped into a compact bundle of desired cross-section. As the shape is imparted to the bundle, a pair of spaced gripping jaws engage the opposite ends of the bundle and then rotate the bundle about its axis, while a pair of tape applying assemblies spaced along the length of the rotating bundle apply adhesively coated tape to the bundle, thereby securing the articles of the bundle.

The elements of the tape applying assemblies are mounted on a carrier plate which rocks a pivoted tape arm into proximity with the rotating bundle. When so rocked, the tape arm is projected into contact with the rotating bundle with considerable force and thereby attaches the adhesively coated surface of the tape to the bundle. After the bundle is rotated through a predetermined number of revolutions, thereby applying to itself a wrap of tape at each revolution, the carrier plate is further rocked to cause a knife thereon to cut the tape.

Finally, the wrapped and tied bundle is released by the gripping and rotating jaws, whereupon the bundle drops to a pair of bundle discharge carriers which constitute extensions of the transfer cradle. When the transfer cradle is again activated, the bundle discharge carriers with the tied bundle thereon, move forward and deposit the tied bundle onto a discharge conveyor.

A more detailed and comprehensive understanding of the invention can be obtained by a perusal of the detailed description thereof which is to be read in light of the accompanying drawings, in which like parts are identified by like reference numerals, and in which.

Figure 1A:
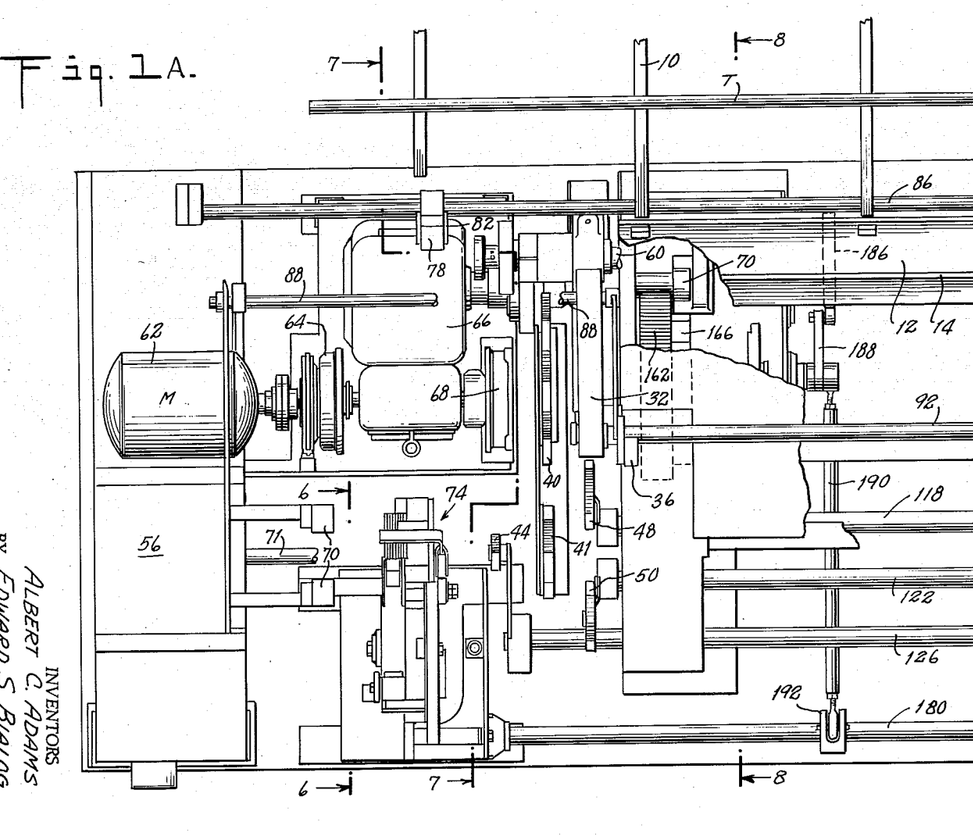
FIGS. 1A and 1B, when taken together, comprise a plan view of the machine with covers removed and others broken away to show underlying structure.
Figure 1B:
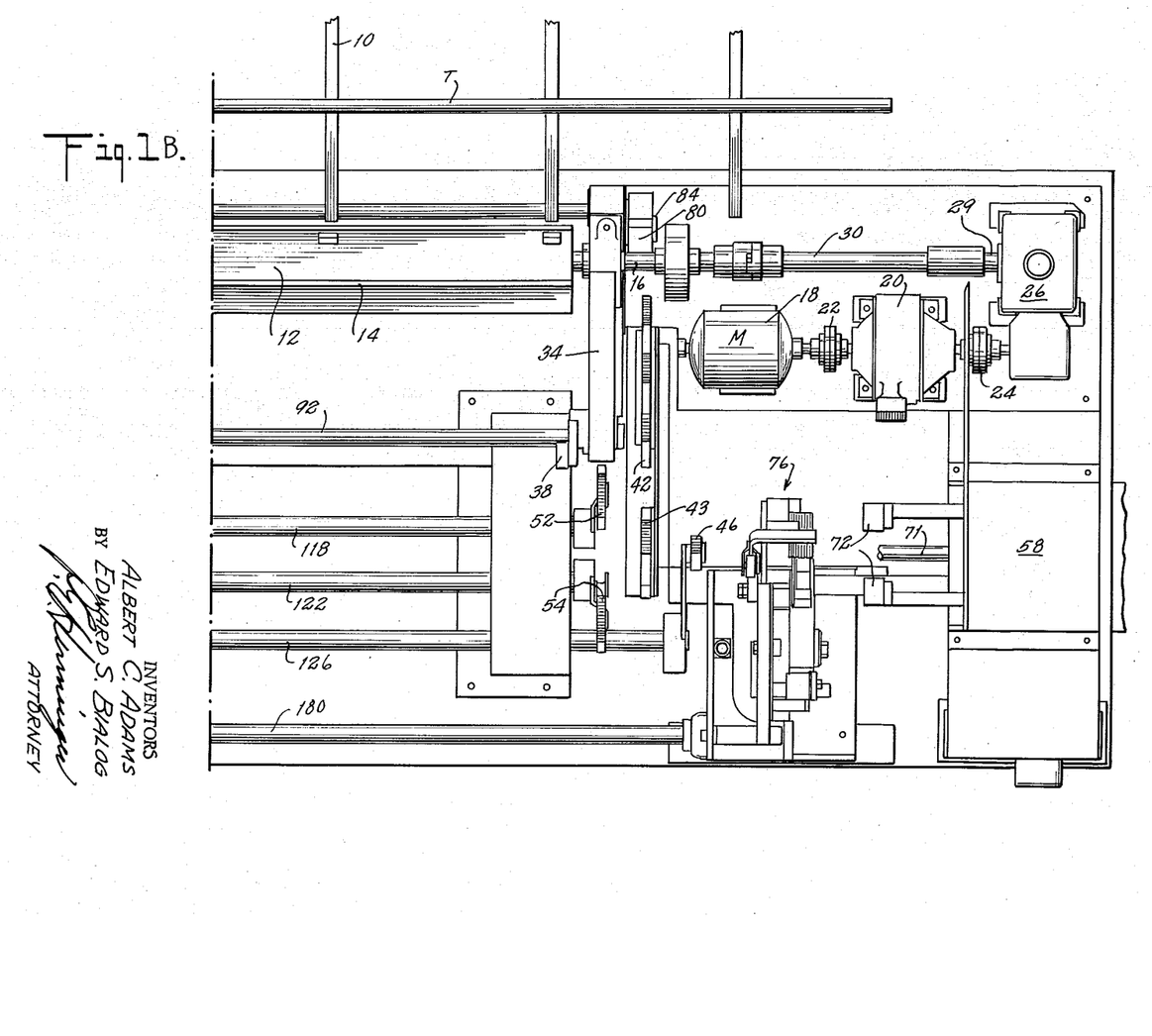

A general understanding of the machine and its operation can be obtained by reference to FIGS. 1A and 1B. In this figure the tubes T to be bundled are delivered to the machine on a table 10 which may consist of a plurality of tube supporting guides which are slanted downwardly toward an elongated rotary tube transfer reel 12. The reel 12 comprises a plurality of outwardly extending tube lifting vanes 14 which are arranged at a tangent to the axis of the reel such as to project forwardly in the direction of clockwise rotation of the reel.

The reel 12 is mounted for rotation on a shaft 16 which is driven from a motor 18 coupled to a speed changer 20 by means of a flexible coupling 22. The output shaft of the speed changer 20 is coupled by means of a flexible coupling 24 to a speed reducer 26, the output shaft 29 of which is coupled to the transfer reel shaft 16 by an intermediate shaft 30.

As the reel 12 rotates the vanes 14 thereof each pick up a single tube from the table 10. The tubes so picked up are transferred by the reel and are deposited on a pair of supports 32 and 34 which are spaced slightly beyond the respective ends of the transfer reel 12. A pair of stop rollers 36 and 38 located at the end of the supports 32 and 34 extend into the path of tubes deposited on the supports 32 and 34 and prevent further movement of the tubes therealong.

Located below the supports 32 and 34, laterally spaced therefrom, but in transverse alignment therewith, are a pair of tube transfer cradles 40 and 42. These cradles, as to be pointed out more particularly as the description proceeds, are mounted for rotation through an arc which will lift the tubes from the supports 32 and 34 and will transfer them to a pair of bottom rests 44 and 46. When the tubes are so deposited on the bottom rests, they will lie between the forming hands 48–50 and 52–54 of a pair of bundle formers located substantially in transverse alignment with the tube supports 32 and 34. The bundle formers are mounted, as to be described in greater detail, such that the hands 48–50 and 52–54 can rock toward and away from each other whereby the confronting faces of the hands will aid in shaping the tube bundle.

Each of the transfer cradles 40 and 42 has a bundle discharge carrier extending forwardly therefrom which is adapted to discharge a bundle of tubes from the machine as a new lot of tubes is transferred by the transfer cradles 40 and 42. Thus, the transfer cradle 40 has attached thereto a discharge carrier 41 while the transfer cradle 42 has attached thereto a discharge carrier 43.

When the tubes are in position within the throats formed by the bundle forming hands 48–50 and 52–54 they are engaged at opposite ends by bundle clutching and rotating mechanisms 56 and 58.

The transfer cradles, bundle formers and bottom rests are all driven from a cam shaft 60 which derives its driving power from a motor 62 by way of an electromagnetic clutch 64 and a reduction gear 66. In order to provide close control over the cam shaft 60, it is also under control of an electromagnetic brake 68.

The bundle clamping devices 56 and 58 provided respectively a pair of jaws 70 and 72 which are adapted to engage opposite ends of the tube bundle for rotation under the influence of a motor driven shaft 71 while a pair of tape applying assemblies 74 and 76 apply tape to the bundle at spaced points along its length.

Since the machine is designed to bundle tubes of different diameters and to form bundles having a selected number of tubes in each, provision has been made to adjust the transfer mechanism to accommodate the same to both variations in tube diameter and number. A stop device between the inner end of the table 10 and the transfer reel 12 is adjustable to space the innermost tube on the table from the axis of the transfer reel 12 such that the vanes 14 will engage and transfer only a single tube at a time. This stop device consists of a pair of rollers 78 and 80 which are mounted on levers 82 and 84 respectively attached to a rotatable shaft 86 which is disposed parallel to the axis of the transfer reel 12 at a point between the table 10 and the transfer reel 12. The stop rollers 78 and 80 are spaced along the length of the shaft 86 such that they are laterally spaced from the respective ends of the transfer reel 12. If tubes of small diameter are being bundled, the shaft 86 will be rotated in a counterclockwise direction, as viewed in FIG. 7, such that the first tube only will be engaged by the vanes of the transfer reel 12. However, if tubes of larger diameter are being bundled, the shaft 86 must be rotated in a clockwise direction to cause the stop rollers 78 and 80 to stop the first tube on the table 10 in such position as to permit the vanes 14 to engage the tube securely for the transfer operation.

Figure 8:
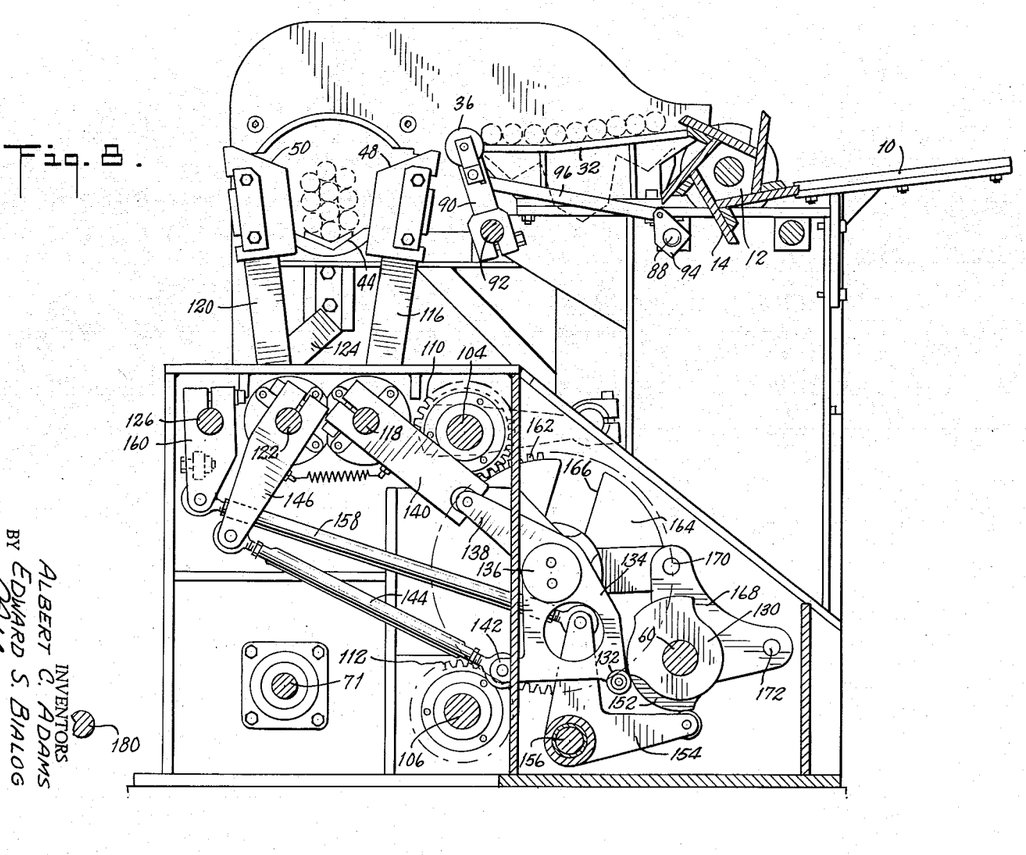
FIG. 8 is a cross-sectional view taken on line 8—8 of FIG. 1.
Figure 9:
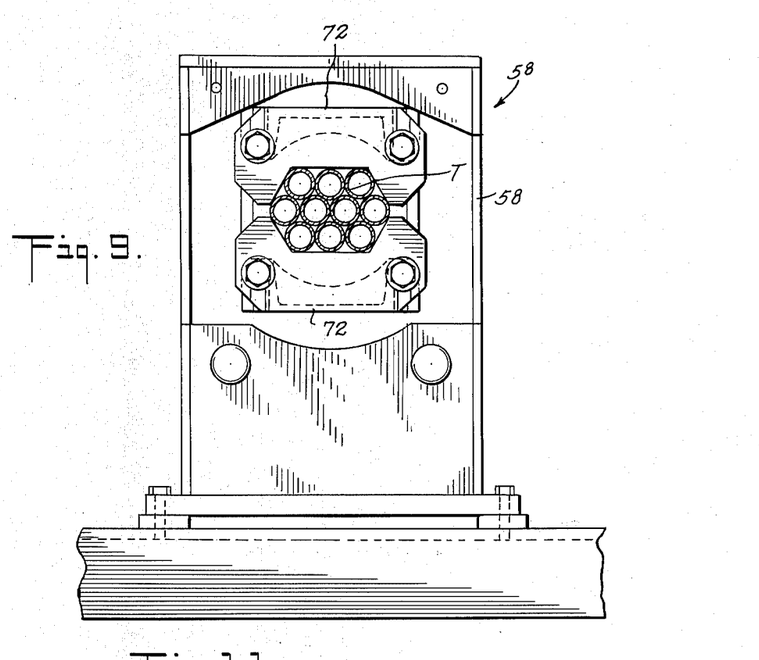
FIG. 9 is an end elevational view of one of the bundle gripping and rotating jaws.

The location of the tubes on the supports 32 and 34 in relation to the transfer cradles 40 and 42, having due regard to both the size of the tubes and the number thereof, is also of importance. Consequently, a second stop device is provided at the forward end of the tube supports 32 and 34 to control the position of the group of tubes to be bundled. This device consists of the stop rollers 36 and 38 which are controlled from a rotatable shaft 88. As best seen in FIG. 8, which shows the stop roller 36, the stop roller is mounted at the end of an arm 90 which is secured to a pivot shaft 92. The arm 90 and its pivot shaft can be rotated in either a clockwise or a counterclockwise direction by rotating and adjusting the angular position of the shaft 88. The arm 90 is secured to the shaft 88 by a bell crank arrangement consisting of a lever 94 and a link 96.

The intended mode of operation of the machine herein can be understood by special reference to FIGS. 1A through 5; FIGS. 2 through 5 being diagrammatic representations designed to illustrate a bundle forming and tying cycle. In these latter figures hyphenated reference numerals have been applied to the tube support, the stop roller, the transfer cradle, the tube forming hands, the bottom rest and the tube discharge carrier, thus identifying the diagrammatic representation of these elements with the pairs which are shown in FIG. 1A and FIG. 1B.

Figure 2:
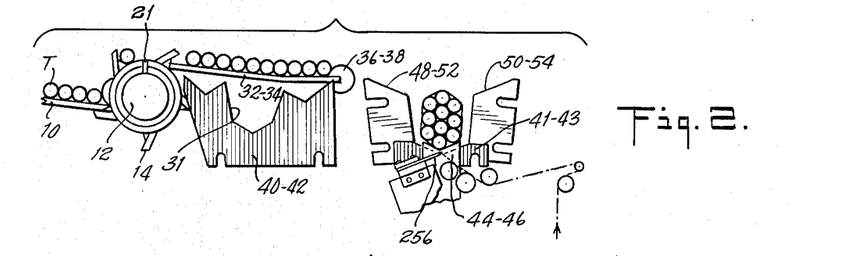
FIGS. 2 through 5 are diagrammatic illustrations of successive steps performed by the machine during a bundle forming and tying cycle.

In FIG. 2, tubes T of uniform length and diameter are continuously supplied to the bundling mechanism on a table 10. The table terminates at the rotating tube transfer reel 12 which, as stated, extends across a substantial portion of the width of the machine. Each of the vanes 14 of the pick-up reel will pick up a single tube from the table 10 and transfer it to the inclined supports 32–34. The first tube so deposited on the supports 32–34 will roll forward into contact with the stop rollers 36–38 at the forward end of the supports 32–34. As each tube is transferred by the reel 12, it passes a proximity switch 21 which transmits an electric pulse to a counter which can be preset to initiate the following transfer phase of the transfer and bundling cycle upon deposit of a predetermined number of tubes on the supports 32–34. The counting and control system forms no part of the present application and will, therefore, be no further described.

When a predetermined number of tubes has been transferred to the supports 32–34, the transfer cradles 40–42 are brought into operation to transfer the tubes from the supports 32–34 to the bundle formers 48–52 and 50–54. In effecting the transfer of the tubes, the transfer cradles travel in an arc which extends upwardly beyond the supports 32–34 and then downwardly through the bundle forming zone between the hands 48–52 and 50–54 of the bundle formers. The transfer cradles are recessed, as shown by the reference numeral 31, for the purpose of imparting a preliminary shape to the tube bundle.

As the tubes are positioned between the bundle shaping hands 48–52 and 50–54 they are supported by the bottom rests 44–46. It should also be noted that the tube supporting surfaces of the bottom rests are shaped to assist in the formation of the bundle.

Figure 3:
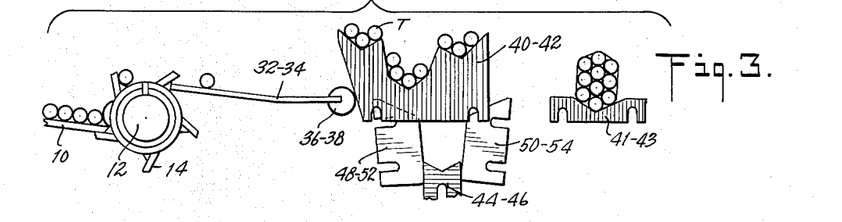

In FIG. 3, it will be seen that the transfer cradles 40–42 have been swung upwardly thereby lifting the tubes T from the supports 32–34 and that the cradles have also moved forwardly in the direction of the throat formed between the hands 48–52 and 50–54 of the bundle formers. As the transfer cradle now drops away from the bundle formers, it will deposit the tubes T between the hands 48–52 and 50–54 of the bundle former and into contact with the bottom rests 44–46. The upper free ends of the bundle former hands 48–52 and 50–54 are slanted toward each other to form a guide for the tubes being deposited on the bottom rests 44–46.

Figure 4:
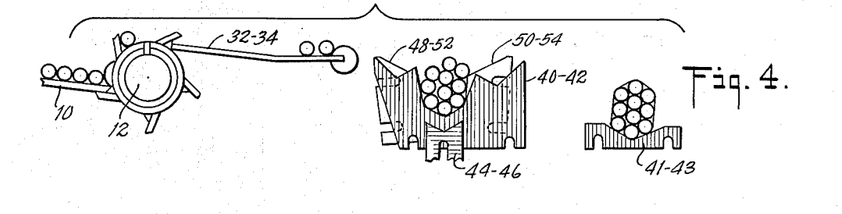
Figure 5:
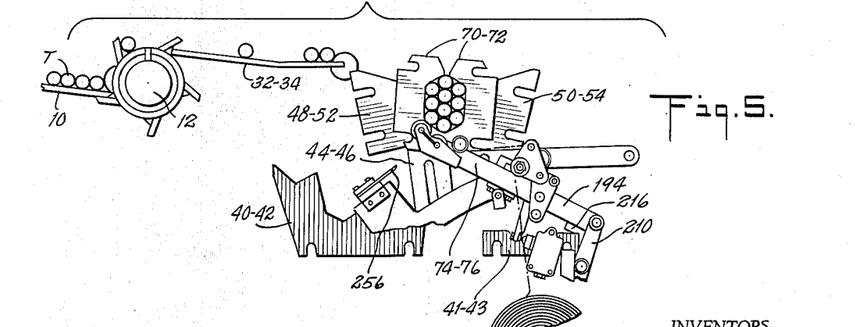

In FIG. 4 is shown the transfer cradle 40–42 receding and it also shows the hands 48–52 and 50–54 of the bundle formers approaching each other to impart further shape to the tube bundle. By the time the hands 48–52 and 50–54 of the bundle former have been fully oscillated toward each other such that their inner faces are substantially parallel, the clamping jaws 70–72 are closed against the opposite ends of the formed bundle as diagrammatically shown in FIG. 5. These jaws grip the now formed bundle of tubes and rotate the tube bundle through a predetermined number of revolutions while the adhesively coated tape is applied to the bundle near the respective ends thereof. The tape applying devices 74–76 come into operation to draw adhesively covered tape from the tape rolls and hold it against the respective ends of the bundle as the bundle is being rotated. As can be seen in FIGS. 3, 4 and 5, the transfer reel 12 continues to transfer tubes from the table 10 to the supports 32–34 while the foregoing bundle forming and tying cycle is being performed.

In FIG. 5, the tape cutting knife is positioned in readiness to sever the tape after a predetermined number of wraps have been wound around the tube bundle. As more fully shown in FIG. 2, the preceding tube bundle has been taped, the tape applying mechanism has receded and the tape cutting knife has been projected across the path of the adhesively covered tape to sever the same.

Concurrent with the operation of the transfer cradles 40–42, their respectively associated discharge carriers 41–43 have been brought into operation to carry the tied bundle of tubes forward in the machine to a discharge point. It should be noted that prior to the operation of the bundle discharge carrier, the bottom rests 44–46 are retracted, such that the bundle itself is entirely supported on the bundle discharge carriers 41–43, as above pointed out. The bundle discharge carriers 41–43 follow the movement of the transfer cradles 40–42 such that they drop the tied bundle into a suitable discharge conveyor.

A specific description of the elements and their combinations by which the foregoing operations are performed will now follow.

Figure 7:
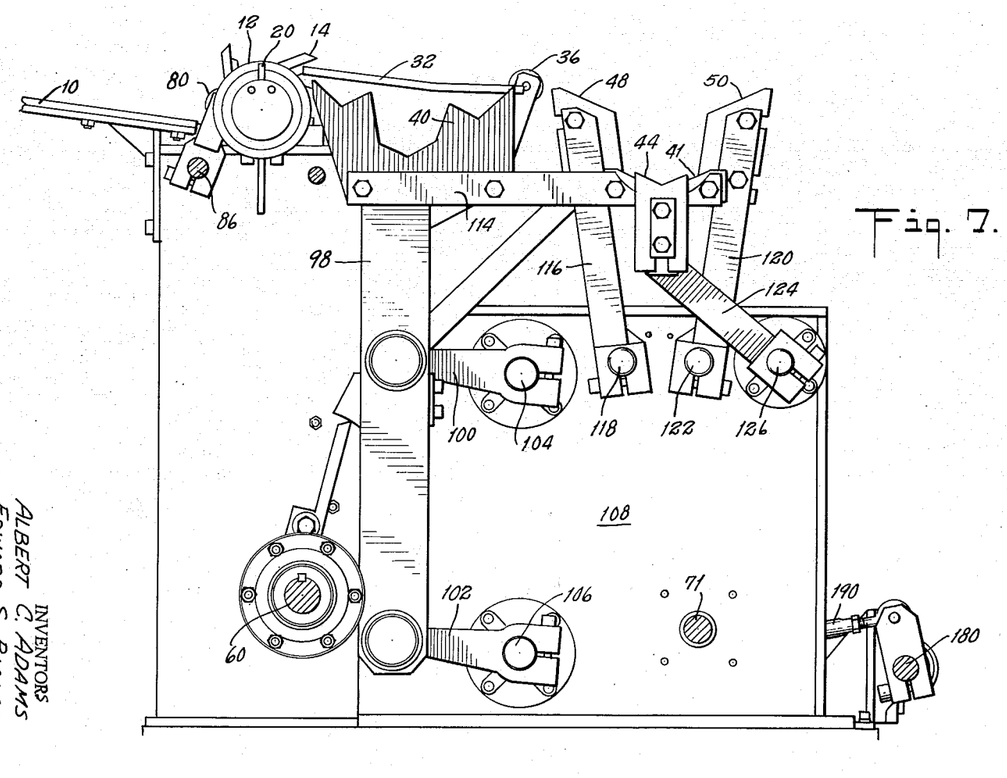
FIG. 7 is a cross-sectional view taken on line 7—7 of FIG. 1.

The manner in which the transfer cradles, the bundle formers, the bottom rests and the bundle discharge carriers are mounted for articulation is best shown in FIG. 7, which is a sectional view on line 7—7 of FIG. 1A. The transfer cradle 40 is mounted at the upper end of a supporting post 98. Journalled to the latter are a pair of crank arms 100 and 102; these arms are respectively secured to a pair of shafts 104 and 106 which are suitably journalled for rotation in a plate 108 constituting a part of the machine frame. To the ends of the shafts 104 and 106 at the opposite face of the plate 108 are secured a pair of drive pinions 110 and 112 respectively (FIG. 8).

Fixed to the top of the post 98 and extending forwardly therefrom in a horizontal direction is an arm 114 to the free end of which is fixed the bundle discharge carrier 41. The bundle former consisting of the bundle forming hands 48–50 is also articulated in the plate 108. The bundle forming hand 48 is carried at the free end of a rocking lever 116 which is fixed to a pivot shaft 118 journalled for rocking motion in the plate 108. Similarly, the bundle forming hand 50 is secured to the free end of a rocking lever 120 which is secured to a pivot shaft 122, also journalled for rocking movement in the frame plate 108.

The bottom rest 44 is secured to an arm 124 which is fixed to an oscillating shaft 126. The latter shaft is journalled in the machine plate 108 for rocking movement.

It will be noted that the bottom rest 44, the transfer cradle 40 and the bundle forming hands 48 and 50 are removably attached to their operating levers so that they are easily removed and can be readily replaced by other corresponding elements of different size and shape which adapt these devices to the bundling of tubes of different diameters whereby regularly shaped bundles can be consistently formed no matter what the diameter of the tube within the capacity of the machine.

Reference to FIG. 8, which is a sectional view on line 8—8 of FIG. 1A, will show the mechanism by which the various bundle forming instrumentalities of FIG. 7 are operated. In that figure, it is seen that the cam shaft 60 has thereon a cam 130 which is in contact with a cam follower 132 carried at one corner on a generally L-shaped plate 134 which is mounted for rocking movement on a bearing 136. A first forwardly projecting arm 138 of the plate 134 is pivoted to one end of a lever 140 whose other end is fixed to the shaft 118. A second forwardly projecting arm 142 of the plate 134 is connected by means of a link 144 to a lever 146 which is fixed to the shaft 122. It is seen, therefore, that the rocking levers 116 and 120 (FIG. 7), together with their bundle shaping hands 48–50, can be controlled by the cam 130 as it rotates. The cam 130 is so shaped as to intermittently open and close the levers 116 and 120. As a plurality of tubes is delivered to the throat between the bundle shaping hands 48–50, the levers 116 and 120 will close to hold and further shape the tubes just prior to closure of the tube clamping jaws 70 and 72 on the ends of the bundle. As soon as the clamping jaws 70 and 72 have engaged the shaped tube bundle, the cam 130 effectively retracts the levers 116 and 120 to release the bundle previously engaged.

The shaft 60 has thereon a second cam 152 which is engaged by a cam follower at one end of a bell crank 154. The bell crank 154 is mounted for rocking movement on a pivot shaft 156. The other end of the bell crank 154 is connected to a link 158 whose opposite end is connected to a lever 160 which, in turn, is clamped to the shaft 126. Through this arrangement, the linkage just described will oscillate the lever 124 which carried the bottom rest 44.

The tube transfer cradle 40 and the bundle discharge carrier 41 are subject to intermittent operation under the influence of a gear 162 which is mounted on the bearing 136 for rotation thereon. The gear 162 is intermittently driven by means of a Geneva drive mechanism consisting of a slotted Geneva plate 164 fixed to one side of the gear 162 and adapted for rotation on the bearing 136. The Geneva plate 164 has five radial slots 166 therein which are spaced about the plate on 72° centers. The drive element for the Geneva mechanism is a generally L-shaped segment 168 which is mounted on the cam shaft 60 for rotation therewith. The drive segment 168 has a pair of rollers 170 and 172 spaced apart 90° from each other which are adapted to engage successive slots of the Geneva plate. It will be noted that the rollers 170 and 172 engage the slots 166 with close tolerance.

The drive gear 162 is in direct engagement with the pinions 110 and 112 fixed to the shafts 104 and 106, respectively, such that when the cam shaft 60 is operated in a counterclockwise direction, the Geneva mechanism will serve to rotate the shafts 104 and 106. The cradle operating linkages just described are so proportioned as to drive the transfer cradle 40 and the bundle discharge carrier 41 through an arc having a radius of seven inches.

Figure 6:
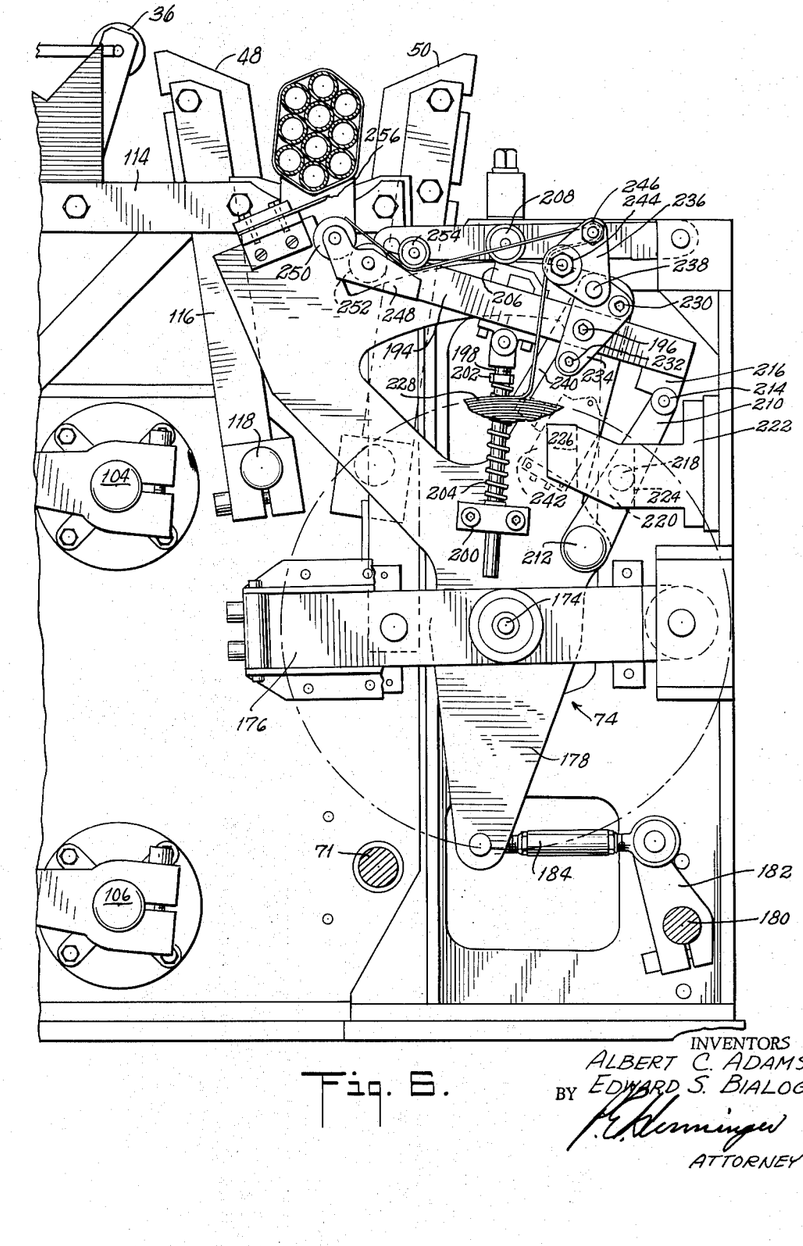
FIG. 6 is a cross-sectional view taken on line 6—6 of FIG. 1.

FIG. 6, which is a view taken on line 6—6 of FIG. 1A, illustrates the details of the mechanism for applying the adhesive coated tape to the tube bundles. This mechanism is mounted for rocking motion on a pivot shaft 174 supported in a rigid bracket 176 attached to the frame. The tape applying mechanism is carried by a Y-shaped carrier plate 178 mounted on the pivot shaft 174 for rocking movement thereabout. The foot of the carrier plate 178 which extends below the pivot shaft 174 is linked to a rock shaft 180 by means of an arm 182 which extends upwardly from the rock shaft, and by a link 184 which is pivoted to the free lower end of the carrier plate and to the free upper end of the arm 182. The rock shaft 180, as shown in FIG. 1A, is caused to oscillate on its axis by means of a cam 186 driven from the cam shaft 60. Motion is transmitted from the cam 186 to the rock shaft 180 by means of a crank 188 and a transmission shaft 190 which terminates at and is attached to a bell crank 192 fixed to the rock shaft 180. It will be appreciated, therefore, that as the cam 186 is rotated, the V-shaped carrier plate 178 will be subjected to a controlled rocking movement about the pivot shaft 174 depending on the shape of the cam 186.

Mounted on the V-shaped carrier plate 178 is all the mechanism which is required to apply the binding tape to the tube bundle. This mechanism consists essentially of a tape roller lever 194 which is pivoted to the carrier plate by a pivot bar 196 which adapts the lever for limited rocking movement. Forwardly of the pivot bar 196, the tape roller lever 194 is supported by a standard 198 which is pivoted to the tape roller lever. The standard 198 extends downwardly through a supporting and guiding bracket 200 which is fixed to the V-shaped carrier plate 178. Between a stop nut 202 at the top of the standard 198 and the upper face of the bracket 200 is a compression spring 204 which biases the free end of the tape roller lever 194 upwardly about its pivot 196.

Carried by the tape roller lever 194 and extending upwardly therefrom is a cam 206 which is adapted to engage a cam roller 208 mounted in a fixed position on the frame of the machine in vertical alignment with the cam 206. The tape roller lever 194, when depressed by the cam roller 208, is held in depressed position by a trigger 210. This trigger is in the form of a lever which is pivoted on the carrier plate 178 by means of a pivot bearing 212. The free end of the trigger 210 has a bearing roller 214 thereon which is adapted to engage a keeper 216 fixed to the lower face of the lever 194 and at the free or forward end of the lever. When the lever 195 is so supported by the trigger 210, the spring 204 will be under sufficient tension to snap the lever 194 upwardly with considerable force when the end of the trigger 210 is disengaged from the keeper 216.

The trigger 210 has a laterally extending pin 218 which operates in a cam slot 220 formed in the rearwardly projecting cam block 222 fixed to the frame of the machine. The cam slot 220 has a surface 224 against which the pin 218 may engage to stop the clockwise movement of the trigger 210. It has a second surface 226 against which the pin 218 engages to effect release of the trigger as the V-shaped carrier plate 178 is rocked in a counterclockwise direction.

A coil of adhesively coated tape 228 is carried by an extension of the pivot shaft 174 and a length of this tape is guided by a series of rollers to the free end of the tape roller lever 194. Attached to the V-shaped carrier plate 178 by means of rivets 230 and 232, together with suitable spacers, is a flange plate 234 which presents an upstanding ear to which a tension plate 236 is connected by a pivot 238. The tension plate 236 has fixed thereto a downwardly extending switch control lever 240 which contacts a circuit breaker 242 whose circuit it holds closed when tape is present and under proper tension.

The plate 236 has a laterally extending friction roller 244 and a free turning guide roller 246 about which the tape is trained. The free end of the tape roller lever 194 has a head 248 thereon in which a pair of soft rollers 250 and 252 are mounted. A guide roller 254 is carried by the tape roller lever 194 near the inner end of the head 248. The tape 228 is properly threaded from its coil by bringing it over the friction roller 244, over the free turning guide roller 246, under the roller 254 and over the two adjacent soft rollers 250 and 252.

A knife blade 256 is carried at the free end of the rearwardly extending arm of the carrier plate 178 in a position to sever the tape when a predetermined number of wraps thereof have been applied to the tube bundle.

After tape has been applied to a tube bundle and the tape has been cut, the carrier plate 178 will be in the extreme position shown in FIG. 6 wherein the tape roller lever 194 is fully depressed by the roller 208 and the trigger 210 is in engagement with the keeper 216. As the operation continues, the carrier plate 178 is retracted by rocking the same in a counterclockwise direction about its pivot shaft 174. This initial movement will serve to withdraw the knife 256 from the immediate vicinity of the tube bundle. A new bundle of tubes is now presented and the carrier plate 178 continues its counterclockwise movement until the cam 206 and its cooperating roller 208 are out of engagement. At this point the tape roller lever 194 is still depressed and under spring tension since the trigger 210 is still engaged in the keeper 216. As the free end of the tape roller lever 194 is carried under the tube bundle, the pin 218 on the trigger 210 will strike the cam surface 226 and thereby disengage the trigger from the keeper. When this takes place, the spring 204 will suddenly pivot the tape roller lever 194 about its pivot 196 and slap the tape on the rollers 250 and 252 against the bottom of the tube bundle. This action takes place with sufficient violence to insure firm adherence of the tape to the tubes. Rotation of the tube bundle will then draw the necessary length of tape from the coil to effectively wrap the tape bundle with a predetermined number of wraps of tape. The relationship between the short end of the tape roller lever 194 and the trigger 210 at this point is substantially as shown in FIG. 5.

As the carrier plate 178 now begins to rock in a clockwise direction, the roller 208 engages the cam 206 and initially depreses the tape roller lever 194. Continued rotation of the carrier plate 178 in a clockwise direction will re-engage the trigger 210 with the keeper 216 and will carry the knife 256 through the tape between the roller 250 and the tape bundle, thereby severing the tape.

Figure 10:
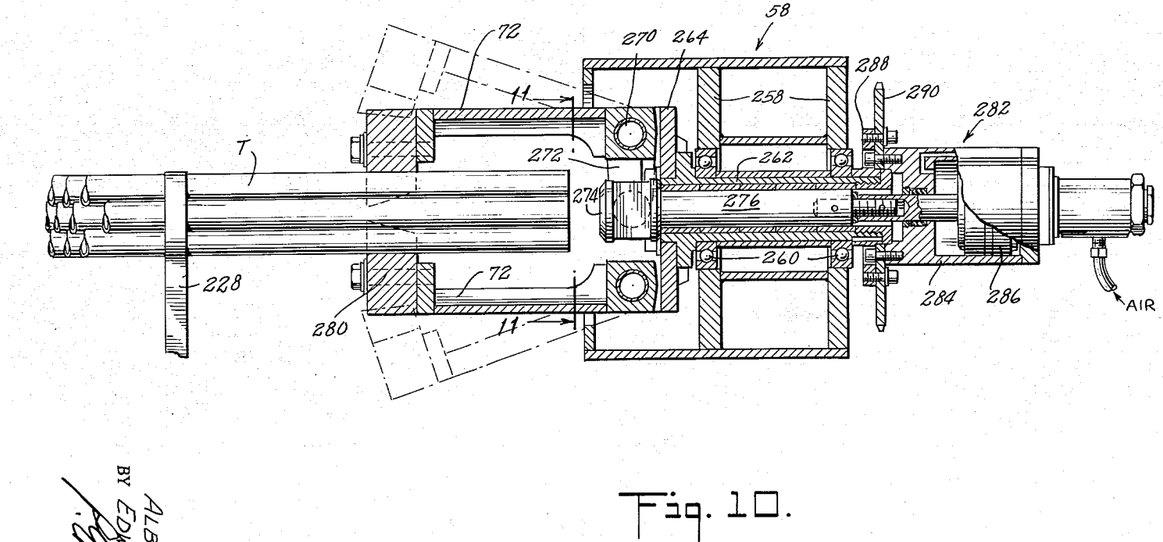
FIG. 10 is a sectional plan view of the gripping jaws of FIG. 9, the jaws being rotated however 90° from the position shown in FIG. 9.

Views of the tube gripping and rotating mechanism are found in FIGS. 9, 10, 11 and 12. As pointed out before, identical tube gripping and rotating jaws such as shown in FIG. 10 are located at each end of the machine as at 56 and 58 in FIGS. 1A and 1B. These jaws are designed to open for the admission of a tube bundle and to close thereabout to finally shape the bundle and rotate the bundle during application of the adhesively coated tape. The jaws are arranged to operate under pneumatic pressure.

Figures 11, 13:
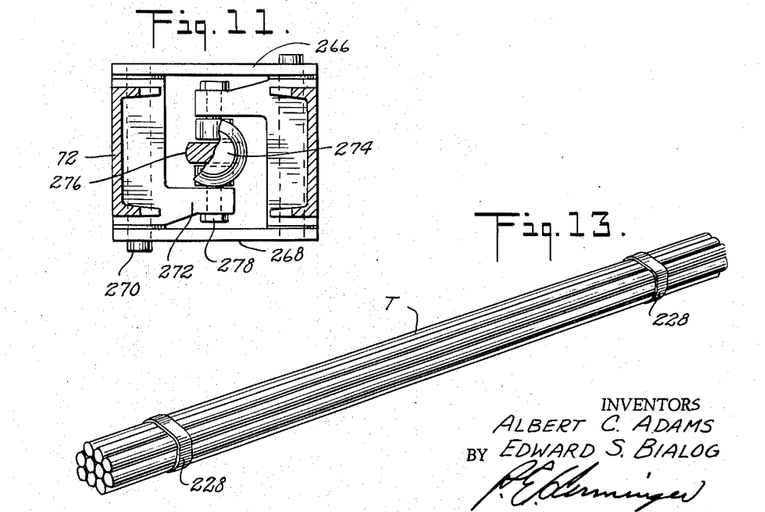
FIG. 11 is a detail view of the gripping jaw structure, partly in section and partly in full line.
FIG. 13 is a perspective view of a bundle of tubes formed by the machine.

FIG. 10 is a sectional plan view of the jaw mechanism 58 at the right end of the machine. It is mounted in bearing plate 258 of the machine frame by means of a set of anti-friction bearings 260. Extending through the bearings 260 is an elongated hub 262 to the inner end of which is fixed a face plate 264. A pair of flanges 266 and 268, as best seen in FIG. 11, extend forwardly from the face plate 264 to provide pivot flanges for the jaws 72. Each of the jaws is pivoted on pivot rods 270 which extend between the flanges 266 and 268 of the head. Extending inwardly in a radial direction from their pivot point, the jaws 72 have an extension 272 which is attached to the head 274 of a piston rod 276. This attachment is effected by a pivot pin 278 which extends through the extension and the piston rod head. Thus if the piston rod 276 is projected, the jaws 72 will pivot about their pivot rods 270 such that they will open to the broken line position shown in FIG. 10 thereby facilitating acceptance of the end of the tube bundle. On the other hand, if the piston rod 276 is retracted, the jaws 72 will be rotated about their pivots 270 to close the jaws around the end of the tube bundle. The jaws of the gripping device have removable lips 280 which are contoured to impart the final shape to the tube bundle. They are removably secured to the jaws so that they can be easily replaced to accommodate bundles composed of larger or smaller tubes.

The piston rod 276 is reciprocated in the hub 262 by means of a pneumatic motor 282 consisting of a cylinder 284 and a double acting piston 286. As more clearly shown in FIG. 12, air is admitted to the pneumatic motor 282 by way of a pair of tubes 292 and 294, the flow being controlled by a conventional solenoid operated four-way control valve 296.

Figure 12:
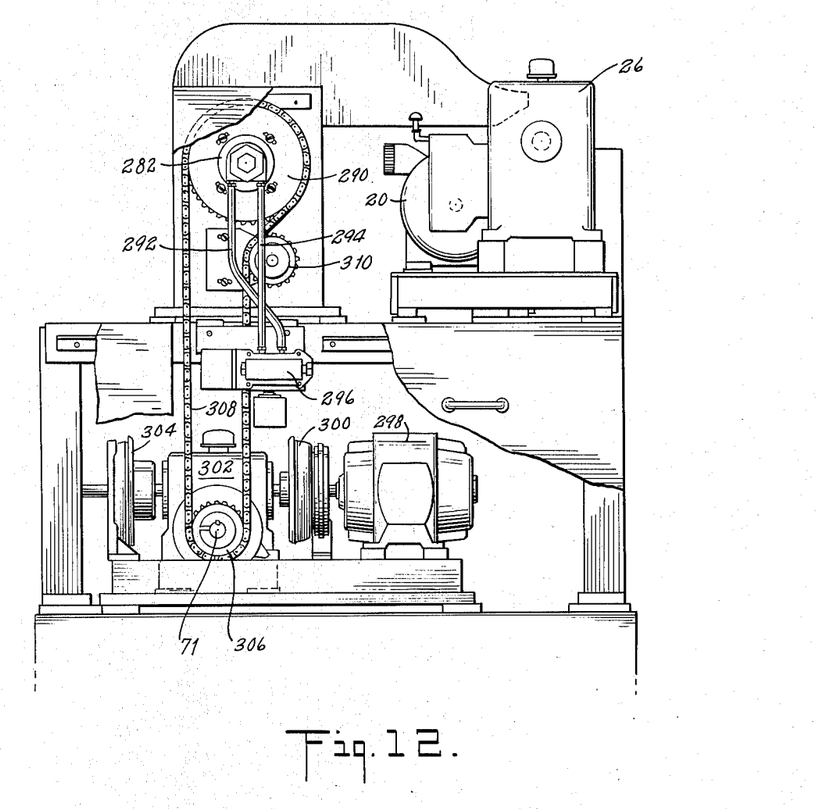
FIG. 12 is an end elevational view of the machine, taken from the right, as viewed in FIG. 1, cover plates being broken away to show underlying structure.

By reference again to FIG. 10, it can be seen that the outer end of the sleeve 262 has attached thereto a flange 288 providing means for rigidly fixing to the sleeve the motor 282 and a sprocket wheel 290 by means of which the jaws are rotated. The drive mechanism by which the jaws are rotated is illustrated in FIG. 12. A motor 298 driving through an electromagnetic clutch 300 and a speed reducer 302 rotates the drive shaft 71. Since close control of the angular position of the gripping jaws is required as well as control over the number of revolutions through which they rotate, the electromagnetic brake 304 is also included in the drive assembly.

A sprocket wheel 306 is keyed to the end of the shaft 71 and a sprocket chain 308 is trained about the sprocket wheel 306 and about the sprocket wheel 290 whereby power is transmitted to the tube clamping and rotating jaws for driving them in rotation. An idler sprocket 310 may be provided along the run of the sprocket chain 308 by means of which its tension may be adjusted. The drive shaft 71 extends across the width of the machine where a similar chain and sprocket arrangement drives the jaws 70 in synchronism.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a tube bundling machine, a rotary transfer reel adapted to engage and transfer single tubes in succession, a tube support adapted to receive tubes from said reel and accumulate thereon a plurality of tubes, a tube transfer device adapted to lift a plurality of tubes from said tube support and transport the same to a tube bundle shaper, a tube bundle shaper adapted to receive a plurality of tubes from said tube transfer device, means for gripping the ends of a bundle of tubes and for rotating the bundle, and means for securing said tubes as a bundle as the tube bundle is being rotated by said gripping and rotating means.

2. In a tube bundling machine, a rotary transfer reel adapted to engage and transfer single tubes in succession, a tube support adapted to receive tubes from said reel and accumulate thereon a plurality of tubes, a tube transfer device adapted to lift a plurality of tubes from said tube support and transport the same to a tube bundle shaper, a tube bundle shaper adapted to receive a plurality of tubes from said tube transfer device, means for gripping the ends of a bundle of tubes and for rotating the bundle, and means for applying adhesive tape about spaced points of said tubes as the tube bundle is being rotated by said gripping and rotating means.

3. In a tube bundling machine, a rotary transfer reel adapted to engage and transfer single tubes in succession, a tube support adapted to receive tubes from said reel and accumulate thereon a plurality of tubes, adjustable stop means associated with said tube support adapted to control the location of a plurality of tubes on said tube support, a tube transfer device adapted to lift a plurality of tubes from said tube support and transport the same to a tube bundle shaper, a tube bundle shaper adapted to receive a plurality of tubes from said tube transfer device, means for gripping the ends of a bundle of tubes and for rotating the bundle, and means for securing said tubes as a bundle as the tube bundle is being rotated by said gripping and rotating means.

4. In a tube bundling machine, a rotary transfer reel adapted to engage and transfer single tubes in succession, a tube support adapted to receive tubes from said reel and accumulate thereon a plurality of tubes, a tube transfer device adapted to lift a plurality of tubes from said tube support and transport the same to a tube bundle shaper, a tube bundle shaper adapted to receive a plurality of tubes from said tube transfer device, a tube rest associated with said tube bundle shaper, means for gripping the ends of a bundle of tubes and for rotating the bundle, means for withdrawing said tube rest from its operative position upon seizure of a bundle of tubes by said gripping and rotating means, and means for securing said tubes as a bundle as the tube bundle is being rotated by said gripping and rotating means.

5. In a tube bundling machine, a rotary transfer reel adapted to engage and transfer single tubes in succession, a tube support adapted to receive tubes from said reel and accumulate thereon a plurality of tubes, a tube transfer device adapted to lift a plurality of tubes from said tube support and transport the same to a tube bundle shaper, a tube bundle shaper adapted to receive a plurality of tubes from said tube transfer device, said bundle shaper having a pair of articulated elements adapted to engage a plurality of tubes and shape the same into a bundle of desired shape, means for gripping the ends of a bundle of tubes and for rotating the bundle, and means for securing said tubes as a bundle as the tube bundle is being rotated by said gripping and rotating means.

6. In a tube bundling machine, a rotary transfer reel adapted to engage and transfer single tubes in succession, a tube support adapted to receive tubes from said reel and accumulate thereon a plurality of tubes, a tube transfer device adapted to lift a plurality of tubes from said tube support and transport the same to a tube bundle shaper, a tube bundle shaper adapted to receive a plurality of tubes from said tube transfer device, a pair of devices for gripping the opposite ends of a bundle of tubes and for rotating the bundle, said gripping means having a pair of pivoted jaws adapted to embrace the ends of a tube bundle, means for pivoting said jaws into an open position to receive a bundle of tubes and for then closing the same into tube bundle embracing position, and means for securing said tubes as a bundle as the tube bundle is being rotated by said gripping and rotating means.

7. In a tube bundling machine, means for gripping the ends of a plurality of tubes constituting a bundle of tubes and for rotating the bundle, and a plurality of spaced adhesive tape applying assemblies associated with said tube gripping and rotating means for applying an adhesively coated tape at spaced points along the length of the tube bundle, said tape applying assemblies each including a tape guide arm, means for forcibly projecting said tape guide arm toward a tube bundle being rotated by said tube gripping and rotating means whereby the free end of an adhesive tape carried by said tape guide arm is brought into adhering contact with the rotating tube bundle, and means thereafter operative to sever the adhesive tape after a length thereof has been wrapped about a tube bundle during rotation thereof.

8. In a tube bundling machine, a pair of devices for gripping the ends of a plurality of tubes constituting a bundle of tubes and for rotating the bundle, and a plurality of spaced adhesive tape applying assemblies associated with said tube gripping and rotating means for applying an adhesively coated tape at spaced points along the length of the tube bundle, said tape applying assemblies each including a pivoted tape guide arm, means for forcibly projecting one end of said tape guide arm toward a tube bundle being rotated by said tube gripping and rotating means whereby the free end of an adhesive tape carried by said end of said tape guide arm is brought into adhering contact with the rotating tube bundle, and means thereafter operative to sever the adhesive tape after a length thereof has been wrapped about a tube bundle during rotation thereof.

9. In a tube bundling machine, a pair of spaced articulated jaws for gripping the ends of a plurality of tubes constituting a bundle of tubes and for rotating the bundle, means for articulating said jaws, and a plurality of spaced adhesive tape applying assemblies associated with said tube gripping and rotating means for applying an adhesively coated tape at spaced points along the length of the tube bundle, said tape applying assemblies each including a tape guide arm, spring loaded means for forcibly projecting said tape guide arm toward a tube bundle being rotated by said tube gripping and rotating means whereby the free end of an adhesive tape carried by said tape guide arm is brought into adhering contact with the rotating tube bundle, means for maintaining said spring loaded means inactive, means for releasing said spring loaded means into activity, and means thereafter operative to sever the adhesive tape after a length thereof has been wrapped about a tube bundle during rotation thereof.

10. In a tube bundling machine, means for accumulating a plurality of tubes to form a bundle thereof, means for imparting a predetermined shape to a bundle of tubes, means for gripping the ends of a plurality of tubes constituting a bundle of tubes and for rotating the bundle, and a plurality of spaced adhesive tape applying assemblies associated with said tube gripping and rotating means for applying an adhesively coated tape at spaced points along the length of the tube bundle, said tape applying assemblies each including a tape guide arm, means for forcibly projecting said tape guide arm toward a tube bundle being rotated by said tube gripping and rotating means whereby the free end of an adhesive tape carried by said tape guide arm is brought into adhering contact with the rotating tube bundle, and means thereafter operative to sever the adhesive tape after a length thereof has been wrapped about a tube bundle during rotation thereof.

11. In a tube bundling machine, means for gripping the ends of a plurality of tubes constituting a bundle of tubes and for rotating the bundle, and a plurality of spaced adhesive tape applying assemblies associated with said tube gripping and rotating means for applying an adhesively coated tape at spaced points along the length of the tube bundle, said tape applying assemblies each including a pivoted tape guide arm having a free end adapted to carry the end of an adhesive tape into contact with a rotating bundle of tubes, normally inactive spring means for forcibly projecting said tape guide arm toward a tube bundle being rotated by said tube gripping and rotating means whereby the free end of an adhesive tape carried by said tape guide arm is brought into adhering contact with the rotating tube bundle, means for rendering said spring means active, and means thereafter operative to sever the adhesive tape after a length thereof has been wrapped about a tube bundle during rotation thereof.

12. In a tube bundling machine, a rotary transfer reel adapted to engage and transfer single tubes in succession, a tube support adapted to receive tubes from said reel and accumulate thereon a plurality of tubes, a tube transfer device adapted to lift a plurality of tubes from said tube support and transfer the same to a tube bundle shaper, a tube bundle shaper adapted to receive a plurality of tubes from said tube transfer device, means for gripping the ends of a plurality of tubes constituting a bundle of tubes and for rotating the bundle, and a plurality of spaced adhesive tape applying assemblies associated with said tube gripping and rotating means for applying an adhesively coated tape at spaced points along the length of the tube handle, said tape applying assemblies each including a tape guide arm, means for forcibly projecting said tape guide arm toward a tube bundle being rotated by said tube gripping and rotating means whereby the free end of an adhesive tape carried by said tape guide arm is brought into adhering contact with the rotating tube bundle and means thereafter operative to sever the adhesive tape after a length thereof has been wrapped about a tube bundle during rotation thereof.

References Cited by the Examiner
UNITED STATES PATENTS

| | | | |
|---|---|---|---|
| 2,080,013 | 5/1937 | Shook | 100—7 |
| 2,123,895 | 7/1938 | Hill | 100—7 |
| 2,387,658 | 10/1945 | Gruber et al. | 100—7 X |
| 2,501,341 | 3/1950 | Krueger | 156—522 X |
| 2,596,862 | 5/1952 | Mirfield | 100—7 |
| 2,631,526 | 3/1953 | Mathey | 100—4 |
| 2,792,775 | 5/1957 | Beyette | 100—15 X |
| 2,818,908 | 1/1958 | Byrnes et al. | 156—522 |
| 3,018,596 | 1/1962 | Dvorak | 53—198 |
| 3,127,829 | 4/1964 | Rossi | 100—4 |
| 3,128,218 | 4/1964 | McGraw | 156—522 |
| 3,135,076 | 6/1964 | Hill | 53—198 X |

WALTER A. SCHEEL, *Primary Examiner.*

TRAVIS S. McGEHEE, *Examiner.*